United States Patent
Khalid et al.

(10) Patent No.: US 11,894,683 B1
(45) Date of Patent: Feb. 6, 2024

(54) SYSTEMS AND METHODS FOR WIND POWER CONTROL AND BATTERY SIZE-REDUCTION

(71) Applicant: KING FAHD UNIVERSITY OF PETROLEUM AND MINERALS, Dhahran (SA)

(72) Inventors: Muhammad Khalid, Dhahran (SA); Miswar Akhtar Syed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 50 days.

(21) Appl. No.: 17/894,319

(22) Filed: Aug. 24, 2022

(51) Int. Cl.
*H02J 3/32* (2006.01)
*H02J 3/38* (2006.01)
*H02J 7/00* (2006.01)
*G06F 17/11* (2006.01)

(52) U.S. Cl.
CPC .............. *H02J 3/32* (2013.01); *G06F 17/11* (2013.01); *H02J 3/381* (2013.01); *H02J 7/0048* (2020.01); *H02J 7/00712* (2020.01); *H02J 2203/10* (2020.01); *H02J 2300/28* (2020.01)

(58) Field of Classification Search
CPC .. H02J 3/32; H02J 3/381; H02J 7/0048; H02J 7/00712; H02J 2203/10; H02J 2300/28; G06F 17/11
USPC .......................................................... 307/43
See application file for complete search history.

(56) References Cited

U.S. PATENT DOCUMENTS

2021/0055334 A1* 2/2021 Min .................... G01R 19/2513

FOREIGN PATENT DOCUMENTS

| CN | 111404192 A | 7/2020 |
| CN | 108988372 B | 11/2021 |

OTHER PUBLICATIONS

Xi, et al. ; Strategy of Smoothing Wind Power Fluctuation Based on H-P filtering Method ; 2019 IEEE Sustainable Power and Energy Conference ; Nov. 21-23, 2019 ; Abstract Only ;1 Page.
Qian, et al. ; An improved seasonal GM(1,1) model based on the HP filter for forecasting wind power generation in China ; Energy, vol. 209; Oct. 15, 2020 ; Abstract Only; 2 Pages.
Ozoegwu ; A Novel Integration of Hodrick-Prescott Filter and Harmonic Analysis with Machine Learning Methods to Enhance Time Series Prediction Accuracy of Daily and Monthly Wind Speeds ; ReaseasrchSquare ; University of Nigeria ; Sep. 30, 2021 ; 24 Pages.

(Continued)

*Primary Examiner* — Richard Tan
(74) *Attorney, Agent, or Firm* — Oblon, McClelland, Maier & Neustadt, L.L.P.

(57) ABSTRACT

A microgrid system is described. The microgrid system includes a Hodrick-Prescott filter configured to generate a filtered power based on an electrical power that is generated from an renewable energy. The microgrid system further includes a battery configured to output a battery power based on the electrical power and the filtered power. Also, the microgrid system includes a state of charge (SoC) control module configured to control charging and discharging of the battery by applying a feedback control on the output battery power.

20 Claims, 15 Drawing Sheets

(56) References Cited

OTHER PUBLICATIONS

Atif, et al. ; Fuzzy logic controller for solar power smoothing based on controlled battery energy storage and varying low pass filter; IET Renewable Power Generation vol. 14, Issue 18 ; pp. 3824-3833 ; IET Journals, the Institution of Engineering and Technology ; Nov. 23, 2020 ; 10 Pages.

Syed, et al. ; Double Moving Average Methodology for Smoothing of Solar Power Fluctuations with Battery Energy Storage ; 2020 International Conference on Smart Grids and Energy Systems ; 1 Page.

Reno, et al. ; PV Ramp Rate Smoothing Using Energy Storage to Mitigate Increased Voltage Regulator Tapping ; IEEE 2016 ; 6 Pages.

Alshehri, et al. ; Power Quality Improvement in Microgrids Under Critical Disturbances Using an Intelligent Decoupled Control Strategy Based on Battery Energy Storage System ; IEEE Access, vol. 7 ; Oct. 23, 2019 ; 13 Pages.

\* cited by examiner

SYSTEMS AND METHODS FOR WIND POWER CONTROL AND BATTERY SIZE-REDUCTION

STATEMENT REGARDING PRIOR DISCLOSURE BY INVENTORS

Aspects of the present disclosure were described in Miswar Akhtar Syed and Muhammad Khalid, "Hodrick Prescott Decomposition for Battery Energy Storage Size Reduction and Wind Power Control for Microgrid Applications," 2021 IEEE PES Innovative Smart Grid Technologies Conference—Latin America (ISGT Latin America), 2021, pp. 1-5, incorporated herein by reference in its entirety.

BACKGROUND

Technical Field

The present disclosure is directed to a Hodrick-Prescott decomposition system and method for wind power control and battery size reduction.

Description Of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over last few decades, production of clean energy through the incorporation of distributed energy resources has increasingly gained attention in the energy industry. Wind power is a widely used and effective source of clean renewable energy. However, the inherent alternating nature of wind power affects stability of a microgrid as it results in frequency variations, voltage deviations, and increased ramp rates. In examples, battery energy storage systems may be incorporated in the microgrid to alleviate issues including the frequency variations, voltage deviations, and increased ramp rates, and to promote an optimal operation by reducing power fluctuations. Further, power firming filters may be combined with the batteries for ramp rate curtailment, power flattening, and cost reduction. In some examples, low pass filters (LPF) and moving average (MA) filters may be used in the microgrid as these are capable filters for fluctuating power control. However, the LPF and MA filters may have poor power tracking capabilities. Poor power tracking may lead to high battery charging/discharging power, which needs to be compensated by utilizing batteries with bigger capacity which increases the operating costs.

Accordingly, it is one object of the present disclosure to provide systems and methods for managing electrical power that is generated from a renewable energy source such as a wind turbine and balance grid energy supply with a battery source under conditions of fluctuating wind power to achieve electrical energy supply and storage control and reduce battery size.

SUMMARY

In an exemplary embodiment, a microgrid system is disclosed. The microgrid system includes a Hodrick-Prescott filter configured to generate a filtered power based on an electrical power that is generated from an renewable energy. Further, the microgrid system includes a battery configured to output a battery power based on the electrical power and the filtered power. The microgrid system further includes a state of charge (SoC) control module configured to control charging and discharging of the battery by applying a feedback control on the output battery power.

In another exemplary embodiment, a method for a microgrid system is disclosed. The method includes generating, by a Hodrick-Prescott filter of the microgrid system, a filtered power based on an electrical power that is generated from an renewable energy. The method also includes outputting, by a battery of the microgrid system, a battery power based on the electrical power and the filtered power. Further, the method includes controlling, by a SoC control module of the microgrid system, charging and discharging of the battery of the microgrid system by applying a feedback control on the output battery power.

In another exemplary embodiment, a non-transitory computer-readable storage medium storing a program executable by at least one processor is disclosed. The program executable by the at least one processor is configured to perform: generating, by a Hodrick-Prescott filter of a microgrid system, a filtered power based on an electrical power that is generated from an renewable energy; outputting, by a battery of the microgrid system, a battery power based on the electrical power and the filtered power; and controlling, by a SoC control module of the microgrid system, charging and discharging of the battery of the microgrid system by applying a feedback control on the output battery power.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
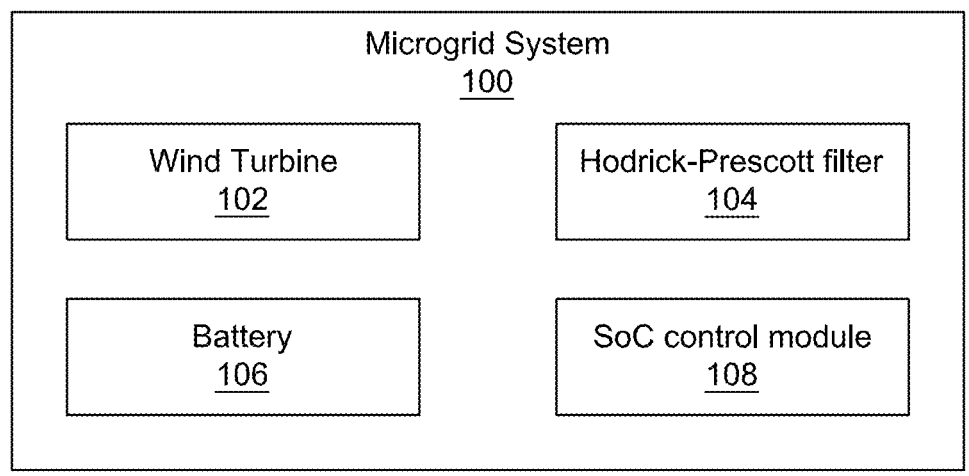
FIG. 1 depicts a block diagram of a microgrid system, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for fluctuating wind power control and battery size reduction. The present disclosure presents a Hodrick-Prescott decomposition filter for smoothing of wind power, increased power tracking, reduced charging/discharging battery power, and appropriate state of charge (SoC) control.

FIG. 1 illustrates a block diagram of a microgrid system 100, according to aspects of the present disclosure. The microgrid system 100 may be a power supply system that includes loads and distributed energy resources, such as renewable energy sources, combined heat and power generation, fuel cell, and energy storage systems. In an aspect, the microgrid system 100 may operate independently or in synchronization with an electricity grid, ensuring the supply with local and reliable energy at all times. The microgrid system 100 can be used in renewable power applications. In an example, the microgrid system 100 can be used in various fluctuating renewable energy resources such as wind power, solar power, and the like.

As shown in FIG. 1, the microgrid system 100 can include a wind turbine 102, a Hodrick-Prescott filter 104, a battery 106, and a SoC control module 108. The wind turbine 102 can be configured to generate an electrical energy. The Hodrick-Prescott filter 104 can be a power firming filter. Further, the microgrid system 100 can include direct current (DC) and alternating current (AC) loads through DC/DC and DC/AC converters.

Figure 2:
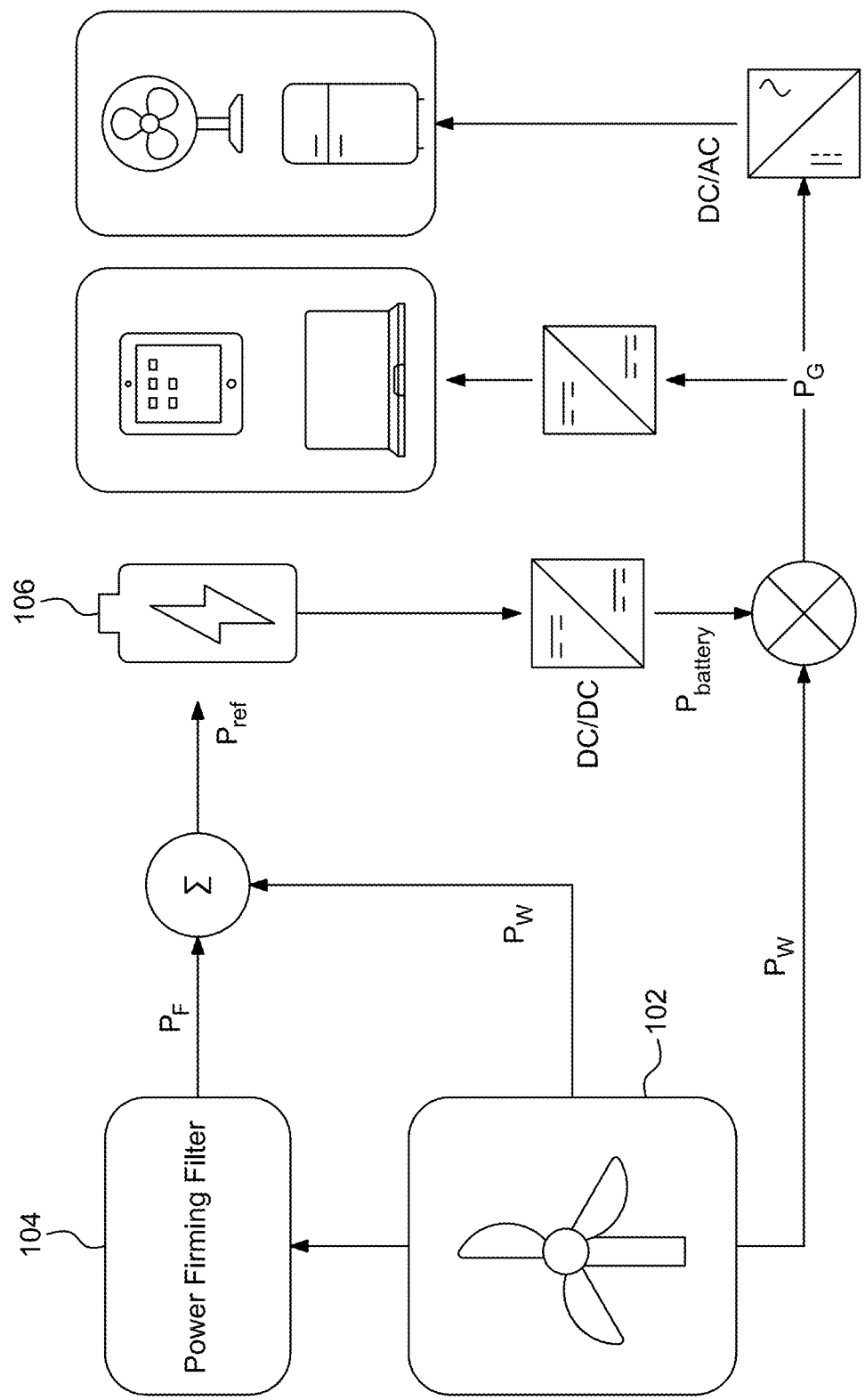
FIG. 2 depicts a detailed block diagram of the microgrid system, according to aspects of the present disclosure.

FIG. 2 depicts a detailed block diagram of the microgrid system 100, according to aspects of the present disclosure.

Under operation, the wind turbine 102 can be configured to generate an electrical power $P_W$ from a wind power. In an example, the electrical power $P_W$ may be a fluctuating power. The electrical power $P_W$ can then be provided as an input to the Hodrick-Prescott filter 104. In an aspect, the Hodrick-Prescott filter 104 can be configured to generate a filtered power $P_F$ based on the generated electrical power $P_W$. Thereafter, the filtered power $P_F$ can be provided as an input to the battery 106. The battery 106 can be configured to output a battery power $P_{battery}$ based on the generated electrical power $P_W$ and the filtered power $P_F$. The battery power $P_{battery}$ may also be referred to as the battery charging and discharging power.

Figure 3:
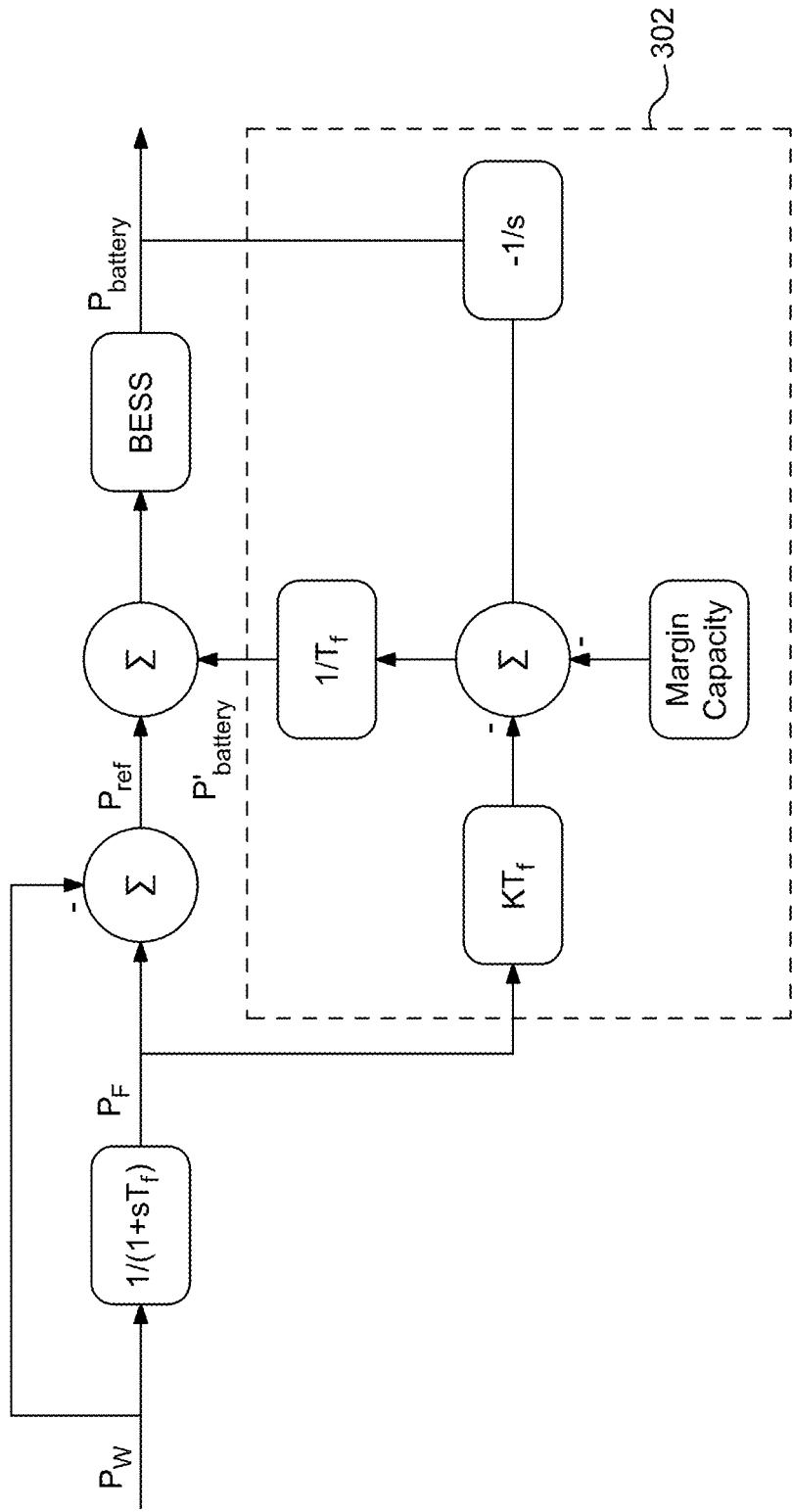
FIG. 3 depicts a battery state of charge feedback control used in the microgrid system, according to aspects of the present disclosure.

FIG. 3 depicts a battery SoC feedback control 302 used in the SoC control module 108 of the microgrid system 100, according to aspects of the present disclosure. The battery SoC feedback control 302 in FIG. 3 can be illustrated by Equations (1) to (8).

In the battery SoC feedback control loop 302, the output battery power $P_{battery}$ can be determined based on a sum of a reference power $P_{ref}$ and a feedback battery power $P'_{battery}$. According to an aspect, the reference power $P_{ref}$ can be determined based on the generated electrical power $P_W$ and the filtered power $P_F$. Further, the feedback battery power $P'_{battery}$ can be determined based on the battery SoC feedback control 302 being applied on the output battery power $P_{battery}$, the filtered power $P_F$, and a storage capacity limit (also referred to as margin capacity) of the battery 106.

The SoC control module 108 can be configured to control charging and discharging of the battery 106 by applying the battery SoC feedback control 302 on the output battery power $P_{battery}$. According to an aspect, an output power $P_G$ of the microgrid system 100 can be generated by summing the generated electrical power $P_W$ and the output battery power $P_{battery}$. In an example, the output power $P_G$ of the microgrid system 100 may also be referred to as grid dispatchable smoothed power. Further, the power from the AC loads can be provided through a DC/AC converter. In FIG. 3, the filtered power $P_F$ can be generated by applying a low pass filter (LPF) to the generated electrical power $P_W$. The LPF can be modelled through the following transfer function ($T_f$=RC):

$$H(s) = \frac{1}{sT_f + 1}. \tag{1}$$

The LPF uses the time constant $T_f$ for power smoothing. Further, a value of the time constant $T_f$ may be user defined. In an example, a large value for the $T_f$ may result in a smoother output but also leads to a poor power tracking. The reference power $P_{ref}$ can be generated by subtracting the generated electrical power $P_W$ from the filtered power $P_F$ and can be expressed as follows:

$$P_{ref}(s) = \frac{-sT_f}{sT_f + 1} \cdot P_W(s). \tag{2}$$

The battery capacity $E_{battery}$ and the SoC of the associated battery is related as follows:

$$SoC(s) = \frac{-P_{battery}(s)}{s \cdot E_{battery}}. \tag{3}$$

In an example, higher battery capacity $E_{battery}$ indicates that the fluctuating wind power can be managed without breaching the lower and upper thermal constraints of the battery 106. The relation between the battery capacity $E_{battery}$, filtered power $P_F$, and the SoC is given as:

$$E_{battery} = \frac{T_f \cdot P_F(s)}{SoC(s)}. \quad (4)$$

To prevent the aforementioned issues that arise due to the battery overcharging and deep discharging, a zoom variable K can be used to tackle and limit the battery capacity $E_{battery}$ as shown in Equation (5) provided below.

$$KT_f \overline{P}_W \leq E_{battery}, \quad (5)$$

where, $\overline{P}_W$ represents the mean fluctuating wind power.

To optimize the value of the coefficient K, an upper battery state of charge limit is introduced as $SoC_{mh}$, and a lower battery state of charge limit is introduced as $SoC_{ml}$.

$$(SoC_{mh} + SoC_{ml}) \cdot E_{battery} = (E_{battery} - KT_f \overline{P}_W), \quad (6)$$

According to an aspect, the battery SoC feedback control 302 can be used to regulate the battery capacity $E_{battery}$ as shown in Equation (7) provided below, where the storage capacity limit (i.e., margin capacity) of the battery 106 is $(E_{battery} - KT_f \overline{P}_W(s))$.

$$P'_{battery} \cdot T_f = \left( SoC(s) \cdot E_{battery} - \left( \frac{KT_f}{sT_f + 1} \cdot P_W(s) \right) - \left( E_{battery} - KT_f \cdot \overline{P}_W(s) \right) \right) \quad (7)$$

In an aspect, the output power $P_G$ of the microgrid system 100 can be a summation of the generated electrical power $P_W$ and the output battery power $P_{battery}$ as shown in Equation (8) provided below.

$$P_G(s) = P_{battery} + P_W(s). \quad (8)$$

According to an aspect, moving average (MA) is a firming technique that uses a sliding window (also referred to as MA filter window) to firm the fluctuations in the time series wind power data by computing on the go averages. The MA filter window size directly impacts the degree of power flattening. In an example, a larger window size may result in a smoother output but also leads to a power lagging and an increased battery charging/discharging power. The power conditioner command attained by the MA technique is explained in Equation (9) provided below:

$$P(t) = \frac{1}{N} \sum_{i=0}^{N-1} P_{Wsys}(t - i \cdot T_S), \quad (9)$$

where, the number N of data points is calculated as $$N = \frac{T_{MA}}{T_S},$$

$T_{MA}$ is the period of the MA filter, and $T_S$ is the control period.

The characteristic gain of the MA filter is described in Equation (10) provided below.

$$G_{MA}(f) = \frac{T_S}{T_{MA}} \cdot \frac{\sin(\pi \cdot f \cdot T_{MA})}{\sin(\pi \cdot f \cdot T_S)}, \quad (10)$$

where, $f$ represents the frequency of the MA filter.

The MA filter phase characteristics may be expressed as:

$$\phi_{MA}(f) = \tan^{-1}\left\{\frac{X_{MA}}{Y_{MA}}\right\}, \quad (11)$$

where, $$X_{MA} = \sin(2\pi f \cdot T_{MA})(1 - \cos(2\pi f \cdot T_S)) - \sin(\pi f \cdot T_S)(1 - \cos(2\pi f \cdot T_{MA})), \quad (12)$$

$$Y_{MA} = \sin(2\pi f \cdot T_{MA})(\sin(2\pi f \cdot T_S) + (1 - \cos(2\pi f \cdot T_{MA})) (1 - \cos(2\pi f \cdot T_S)). \quad (13)$$

The MA filter corner frequency may be calculated as follows:

$$f_c = \frac{\sqrt{2}}{\pi \cdot T_{MA}}. \quad (14)$$

According to aspects of the present disclosure, the Hodrick-Prescott decomposition can be employed for smoothing of wind power. In examples, the Hodrick-Prescott decomposition is a smoothing technique that decomposes the time series data $Y_t$ of the wind power into trend components $g_t$ and cyclical components $c_t$. In an aspect, the Hodrick-Prescott filter 104 can utilize the Hodrick-Prescott decomposition technique to decompose the time series data $Y_t$ of the wind power into the trend components $g_t$ and cyclical components $c_t$. Further, weights of the Hodrick-Prescott filter 104 can be determined by solving a constrained minimization problem over the trend components $g_t$. In an example, the trend components $g_t$ are the progression of the wind power over time T Further, the cyclical components $c_t$ are the fluctuations in the long-term progression of the wind power data $Y_t$. The time series data $Y_t$ of the wind power can be represented by the combination of the trend components $g_t$ and the cyclical components $c_t$ as:

$$Y_t = G_t C_t. \quad (15)$$

According to an aspect, the smoothing technique can be linearized by taking a logarithm of Equation (15) as provided below:

$$\ln Y_t = \ln G_t + \ln C_t \text{ or } y_t = g_t + c_t; \quad (16)$$

$$c_t = Y_t - h_t. \quad (17)$$

The constrained minimization problem is mathematically represented by Equation (18) provided below.

$$Y_t = \min_{g_t}\left\{\sum_{t=1}^{T} c_t^2 + \lambda \sum_{t=2}^{T-1} [(g_{t+1} - g_t) - (g_t - g_{t-1})]^2\right\}, \quad (18)$$

where, T indicates a total time for the wind power and A represents a smoothing parameter of the Hodrick-Prescott filter 104. In an example, the smoothing parameter A of the Hodrick-Prescott filter 104 can be around 50000.

By substituting Equation (17) in Equation (18), $$Y_t = \min_{g_t}\left\{\sum_{t=1}^{T}(y_t - g_t)^2 + \lambda \sum_{t=2}^{T-1}[(g_{t+1} - g_t) - (g_t - g_{t-1})]^2\right\}, \quad (19)$$

where, the first term of Equation (19)

$$\text{``}\sum_{t=1}^{T}(y_t - g_t)^2\text{''}$$

represents the sum of the fluctuations in the wind power, and the second term of Equation (19)

$$\text{``}\lambda\sum_{t=2}^{T-1}[(g_{t+1} - g_t) - (g_t - g_{t-1})]^2\text{''}$$

represents the sum of the trend components $g_t$ second differences multiplied by the smoothing parameter $\lambda$. The first term penalizes the cyclical components $c_t$ (or the fluctuating components) of the wind power data and the second term penalizes the variations in the trend component growth rate.

$$F = \begin{pmatrix} 1 & -2 & 1 & & & & & \\ -2 & 5 & -4 & \ddots & & & & \\ 1 & -4 & 6 & \ddots & \ddots & & & \\ & \ddots & \ddots & \ddots & \ddots & \ddots & & \\ & & \ddots & \ddots & 6 & -4 & 1 & \\ & & & \ddots & -4 & 5 & -2 & \\ & & & & 1 & -2 & 1 & \end{pmatrix}. \quad (20)$$

For a sample size of T, the minimization problem as illustrated in Equation (19) has a unique solution formulated as:

$$\hat{g} = (I_n + \lambda \cdot F)^{-1} \cdot y \quad (21)$$

where $I_n$ represents an identity matrix and F represents a Penta diagonal matrix of order n×n for t≥5, the empty spaces are zero elements.

The trend components $g_t$ and the cyclical components $c_t$ of the time series data $Y_t$ of the wind power are weighted averages of $y_t$'s:

$$\hat{g}_t = \sum_{j=1}^{n} p_{t,j} y_j, \text{ where } t = 1, \ldots, T. \quad (22)$$

In an example, the $(t,j)^{th}$ element of $(I_n + \lambda \cdot F)^{-1}$ are the weights of the Hodrick-Prescott filter 104 in a finite sample.

Examples and Experiments

The following examples are provided to illustrate further and to facilitate the understanding of the present disclosure.

Experimental data and analysis

The Hodrick-Prescott filter 104 as described herein, is assessed in MATLAB with reference to the MA filters and the LPFs by carrying out simulations on the imported real wind power data for the year 2010. The implementation of the Hodrick-Prescott filter 104 was compared to the standard MA filter and LPF with respect to its wind power control ability, battery SoC control, and charging/discharging reduction performance.

Figure 4:
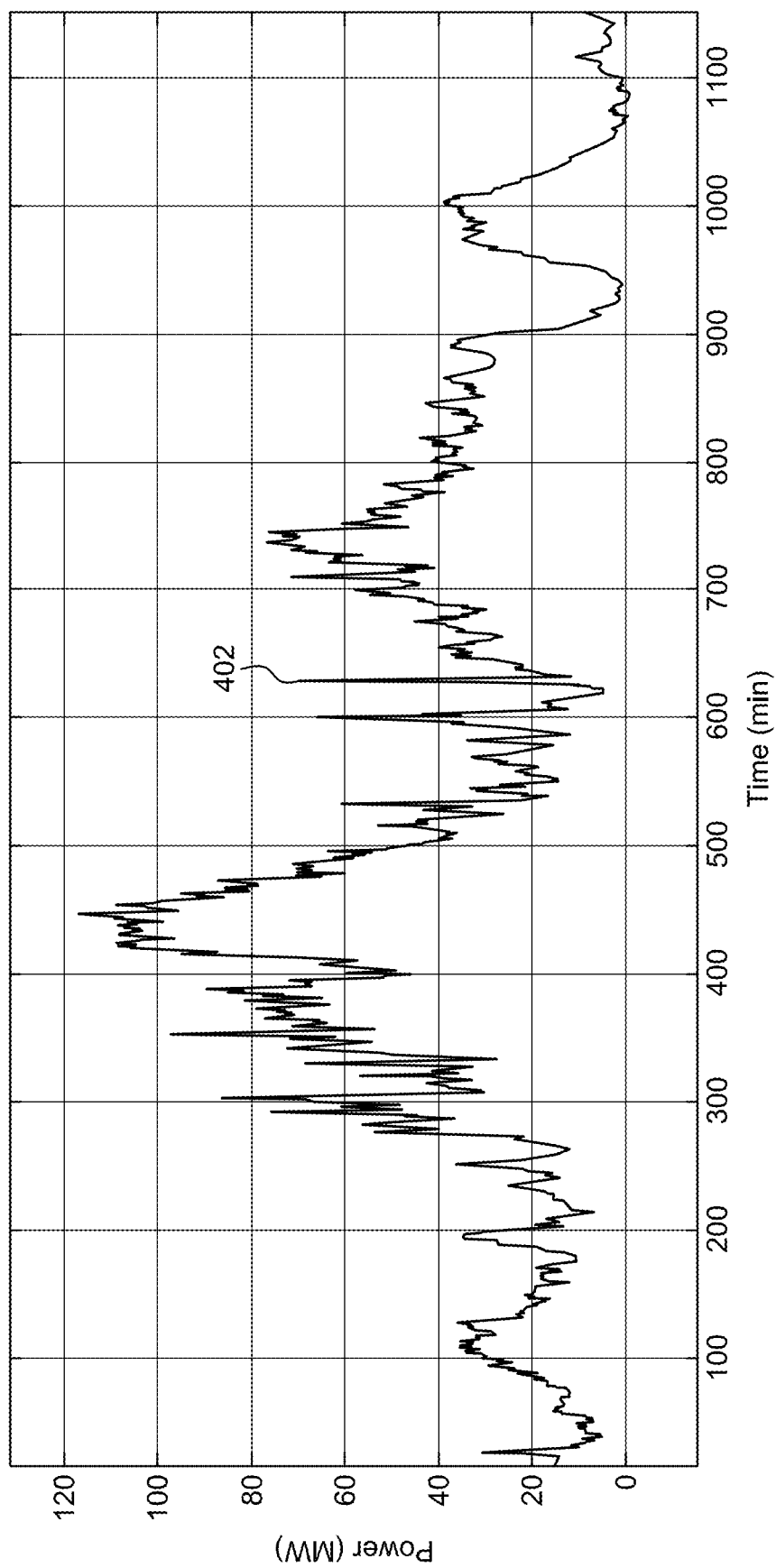
FIG. 4 depicts a wind power profile based on recorded data, according to some aspects of the present disclosure.

FIG. 4 depicts a wind power profile 402 based on recorded data, according to some aspects of the present disclosure. In an aspect, the wind power profile 402 shown in FIG. 4 is of 5 minute resolution and is obtained from the Roaring 40 seconds wind park situated in Woolnorth, Tasmania, Australia.

Figure 5A:
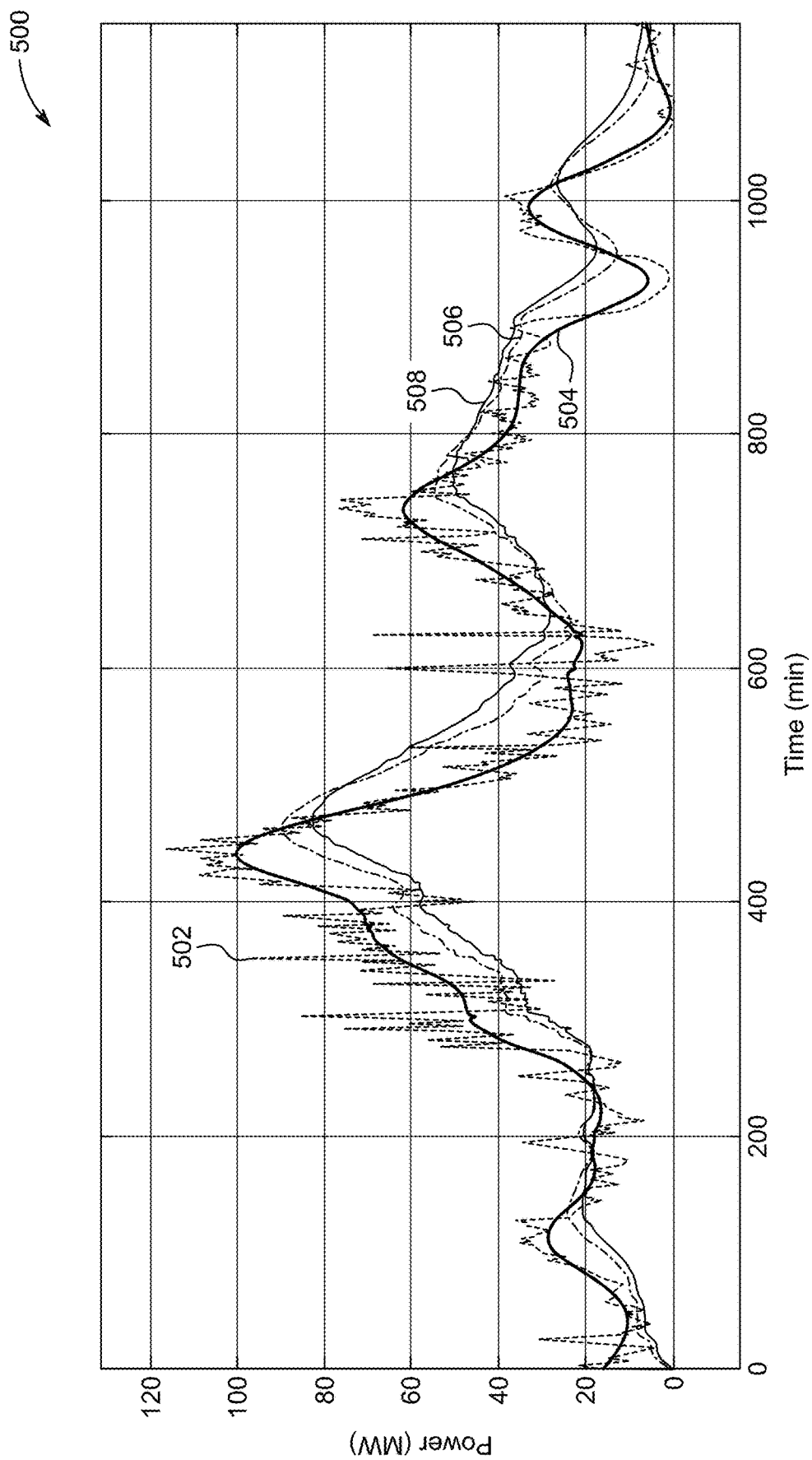
FIG. 5A is a plot illustrating a wind power firming performance of a Hodrick-Prescott filter in comparison to a first low pass filter (LPF) having a time constant value of 48 minutes and a second LPF having a time constant value of 60 minutes, according to aspects of the present disclosure.
Figure 5B:
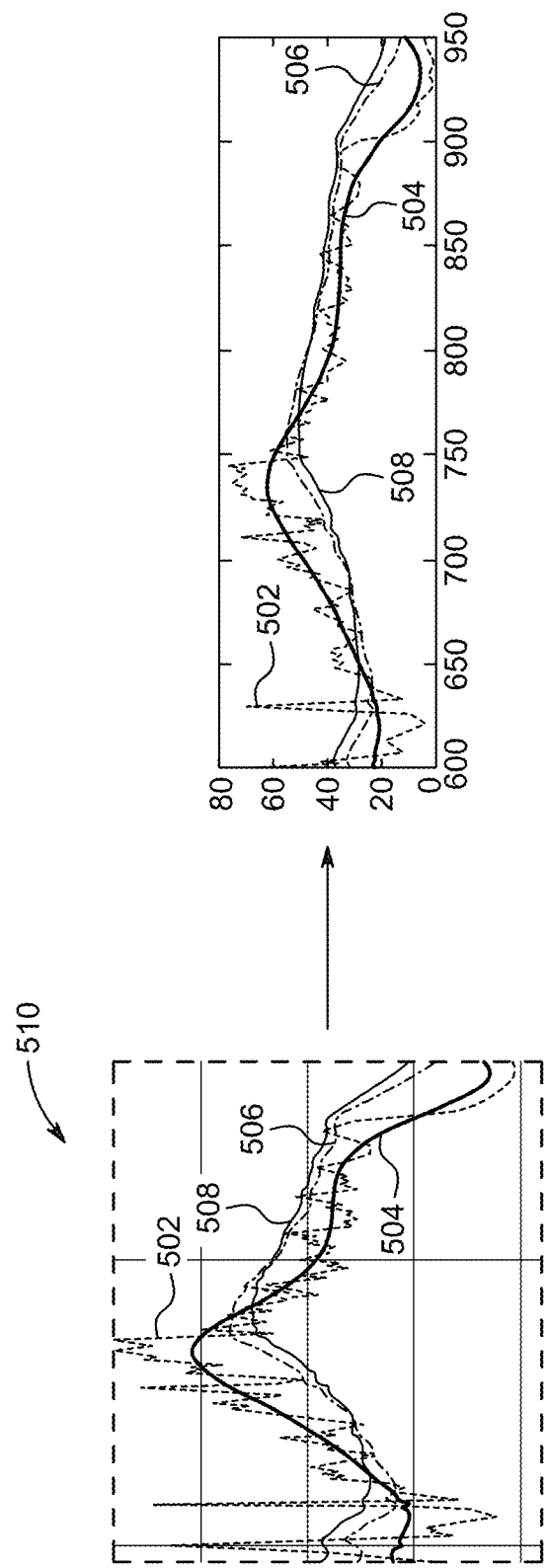
FIG. 5B depicts an enlarged portion of the plot of FIG. 5A, according to some aspects of the present disclosure.

FIG. 5A is a plot 500 illustrating a wind power firming (or smoothing) performance of the Hodrick-Prescott filter 104 in comparison to a first LPF having a time constant value of 48 minutes and a second LPF having a time constant value of 60 minutes, according to aspects of the present disclosure. FIG. 5B depicts an enlarged portion 510 of the plot of FIG. 5A, according to some aspects of the present disclosure.

A plot line 502 illustrates the wind power, plot line 504 illustrates a performance of the Hodrick-Prescott filter 104, plot line 506 illustrates a performance of the first LPF having the time constant value of 48 minutes, and the plot line 508 illustrates a performance of the second LPF having the time constant value of 60 minutes. The value of the smoothing parameter $\lambda$ for the Hodrick-Prescott filter 104 was determined through multiple experimental trials, and it was found that $\lambda$=50000 results in excellent wind power firming and tracking. From FIG. 5A and 5B it is evident that both the LPFs suffer from severe power lagging, whereas the Hodrick-Prescott filter 104 has exceptional power tracking with a smoother output. According to an aspect of the present disclosure, the power lag caused by the LPFs is compensated by incorporating larger batteries into the microgrid system 100.

Figure 6A:
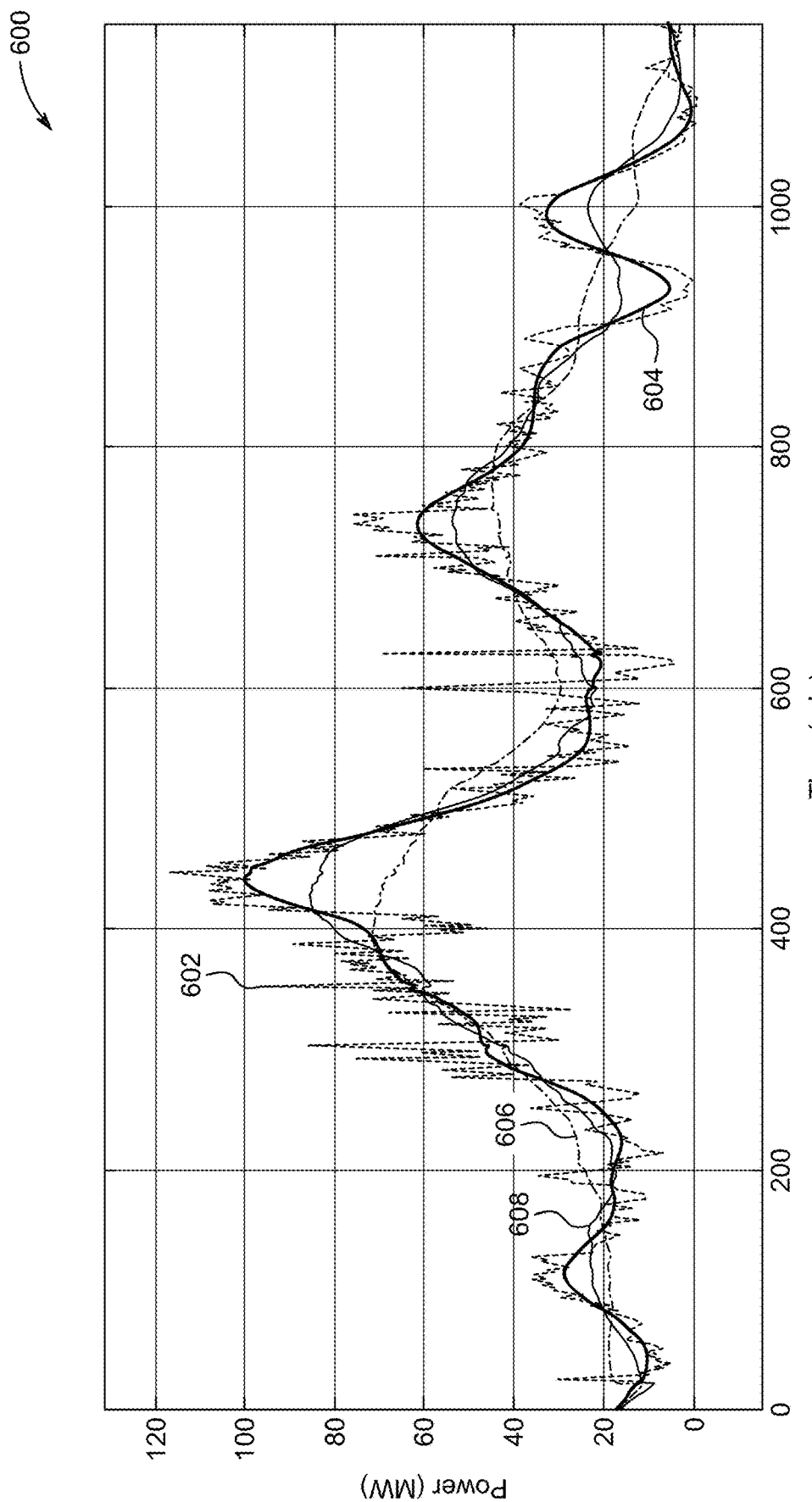
FIG. 6A is a plot illustrating a wind power firming performance of the Hodrick-Prescott filter in comparison to a first moving average (MA) filter having a window size of 100 minutes and a second MA filter having a window size of 200 minutes, according to aspects of the present disclosure.
Figure 6B:
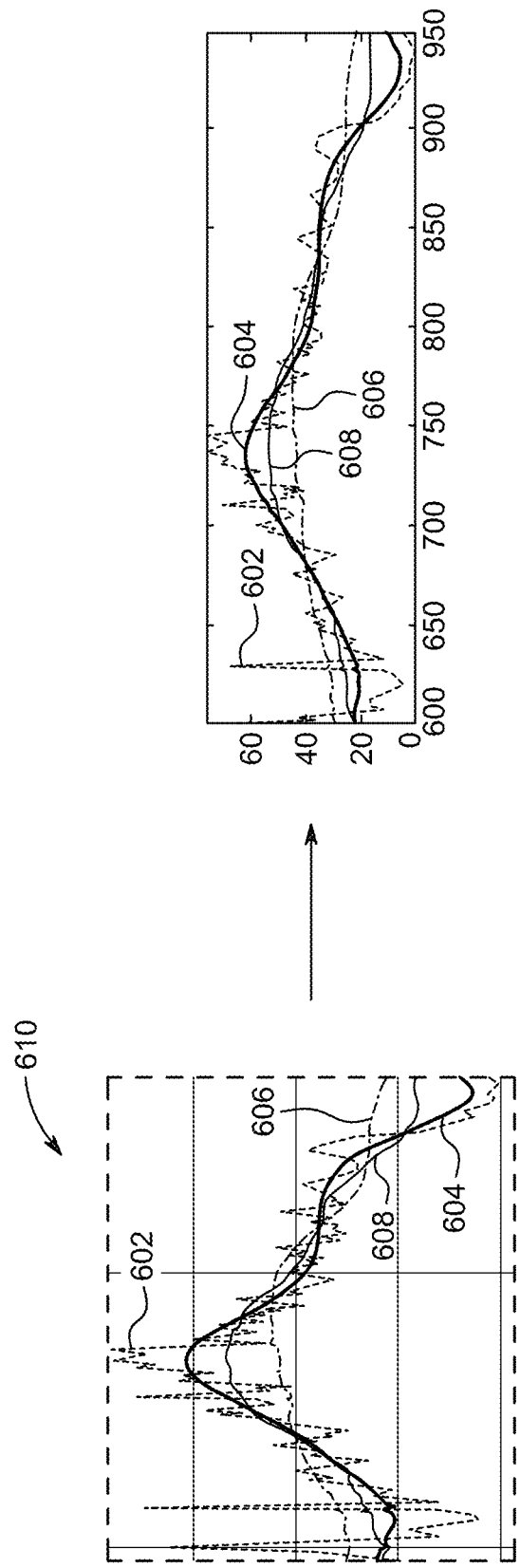
FIG. 6B depicts an enlarged portion of the plot of FIG. 6A, according to some aspects of the present disclosure.

FIG. 6A is a plot 600 illustrating a wind power firming (or smoothing) performance of the Hodrick-Prescott filter 104 in comparison to a first MA filter having a window size of 100 minutes and a second MA filter having a window size of 200 minutes, according to aspects of the present disclosure. FIG. 6B depicts an enlarged portion 610 of the plot of FIG. 6A, according to some aspects of the present disclosure.

Plot line 602 illustrates wind power, plot line 604 illustrates a performance of the Hodrick-Prescott filter 104 (where $\lambda$=50000), plot line 606 illustrates a performance of the first MA filter having the window size of 100 minutes, and the plot line 608 illustrates a performance of the second MA filter having the window size of 200 minutes. From FIG. 6A and FIG. 6B it is evident that the Hodrick-Prescott filter 104 achieves better power firming in comparison to both the MA filters having the window sizes 100 and 200 minutes, respectively. Both the MA filters result in output power lag, whereas the Hodrick-Prescott filter 104 has better reference power tracking while achieving a higher degree of smoothing. Also, the time delay due to the MA filters increases as the window sizes increases.

Figure 7:
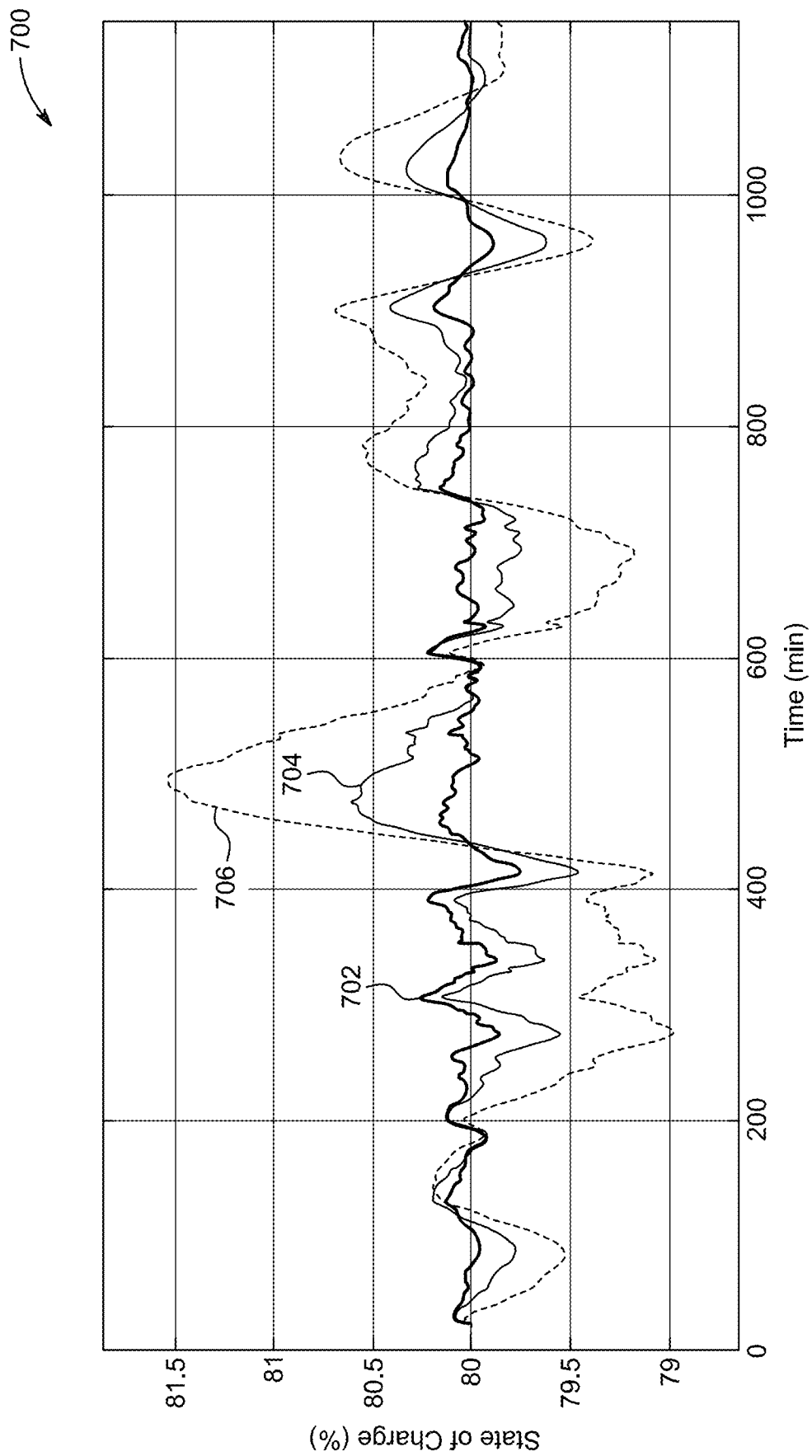
FIG. 7 is a plot illustrating a battery state of charge (SoC) management performance of the Hodrick-Prescott filter in comparison to a first MA filter having a window size of 100 minutes and a second MA filter having a window size of 200 minutes, according to aspects of the present disclosure.

FIG. 7 is a plot 700 illustrating a battery SoC management performance of the Hodrick-Prescott filter 104 in comparison to the first MA filter having the window size of 100 minutes and the second MA filter having the window size of 200 minutes, according to aspects of the present disclosure. Plot line 702 illustrates a performance of the Hodrick-Prescott filter 104 (where $\lambda$=50000), plot line 704 illustrates a performance of the first MA filter having the window size of 100 minutes, and plot line 706 illustrates a performance of the second MA filter having the window size of 200 minutes. It is evident from FIG. 7, that the Hodrick-Prescott filter 104 has a significantly better battery SoC management ability in comparison to both the MA filters having the window sizes 100 and 200 minutes, respectively. Further, greater overcharging and deep discharging of the battery occurs through the utilization of the MA filters as compared to the Hodrick-Prescott filter 104. The second MA filter having the window size of 200 minutes, has a considerably fluctuating SoC which can directly reduce a lifespan of the integrated battery, whereas the Hodrick-Prescott filter 104 has a significantly steady SoC.

Figure 8:
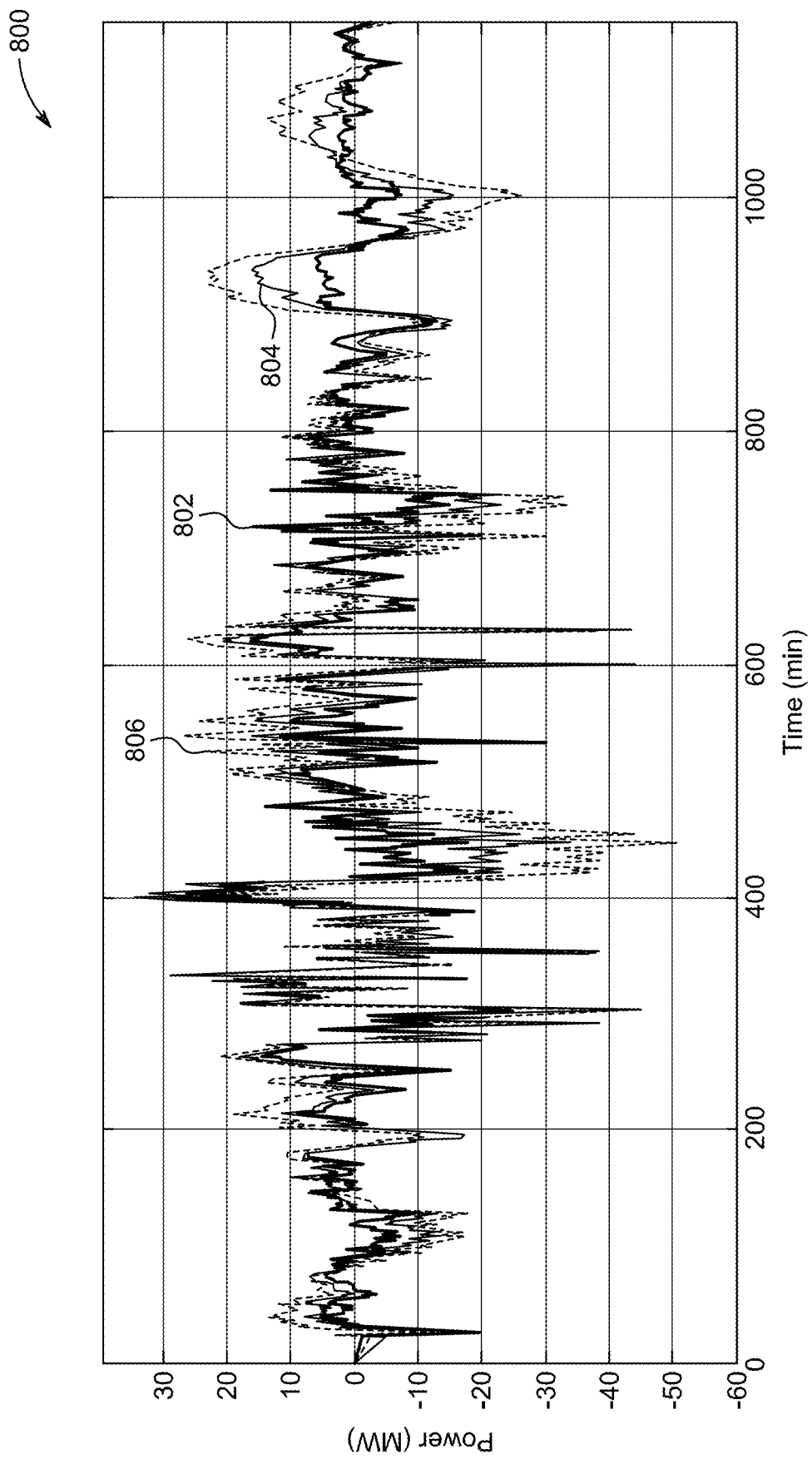
FIG. 8 is a plot illustrating a battery charging and discharging based assessment of the Hodrick-Prescott filter in comparison to the first MA filter having the window size of 100 minutes and the second MA filter having the window size of 200 minutes, according to aspects of the present disclosure.

FIG. 8 is a plot 800 illustrating a battery charging and discharging based assessment of the Hodrick-Prescott filter 104 in comparison to the first MA filter having the window size of 100 minutes and the second MA filter having the window size of 200 minutes, according to aspects of the present disclosure. Plot line 802 illustrates a performance of the Hodrick-Prescott filter 104 (where λ=50000), plot line 804 illustrates a performance of the first MA filter having the window size of 100 minutes, and plot line 806 illustrates a performance of the second MA filter having the window size of 200 minutes. It is evident from FIG. 8 that the Hodrick-Prescott filter 104 results in decreased battery charging and discharging in comparison to both the MA filters having the window sizes 100 and 200 minutes, respectively. From FIG. 6 and FIG. 7 it can be concluded that the Hodrick-Prescott filter 104 can improve the battery lifetime and reduce the size of the battery needed while achieving a higher degree of power smoothing.

Results have established that the Hodrick-Prescott filter 104 has excellent wind power firming (smoothing or flattening) and trailing performance in comparison to the LPF and MA filter even with the significantly large smoothing parameter of the Hodrick-Prescott filter 104. As compared to the LPF and MA filter, the Hodrick-Prescott filter 104 leads to decreased battery charging/discharging and better state of charge control which in turn reduces the size of the batteries required for an operation. Thus, a better wind power control can be achieved with the Hodrick-Prescott filter 104 while reducing the size of the batteries required.

Figure 9:
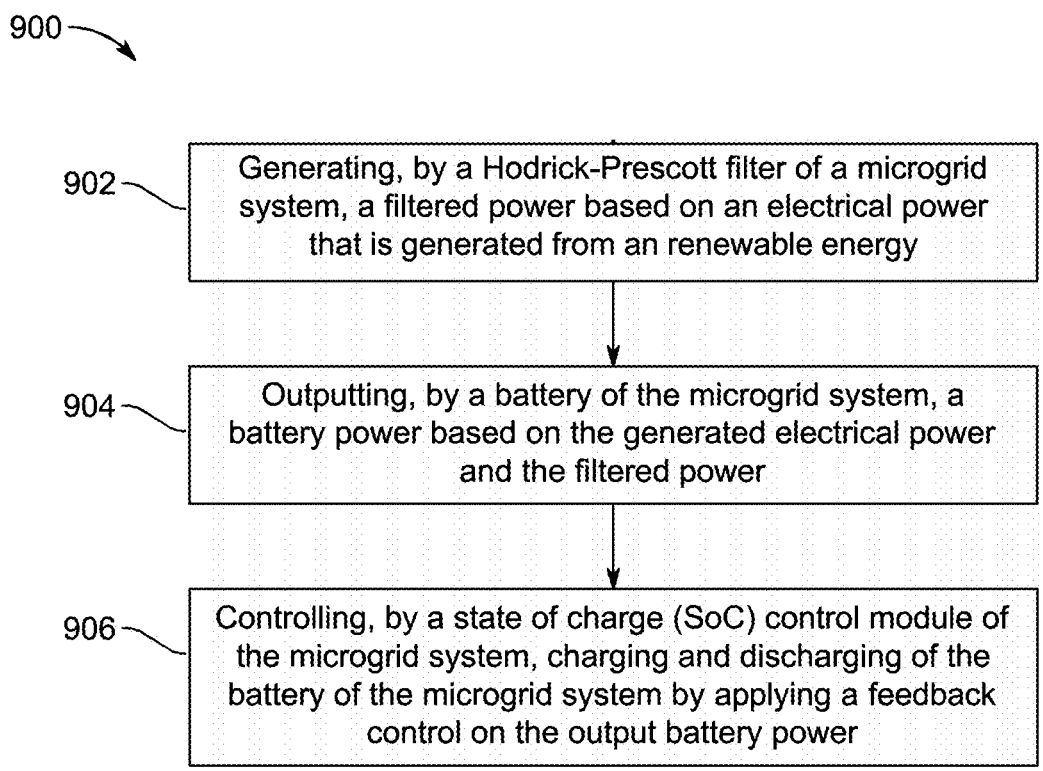
FIG. 9 illustrates a method for controlling charging/discharging of a battery of the microgrid system, according to aspects of the present disclosure.

It is noted that the wind power is utilized in this disclosure just for illustration. The microgrid system 100 including the Hodrick-Prescott filter 104 is universal enough to be utilized in various fluctuating renewable energy resources such as solar power, water power, and the like. FIG. 9 illustrates a method 900 for controlling charging/discharging of the battery 106 of the microgrid system 100, according to aspects of the present disclosure. The method 900 can be executed by computer hardware such as a controller 1000 in FIG. 10, a data processing system 1100 in FIG. 11, a processor 1130 in FIG. 11 and FIG. 12, distributed components in FIG. 13, and the like. The method 900 can also be implemented in software instructions, thus when the computer hardware executes the software instructions, the computer hardware performs the method 900.

At step 902, the method 900 includes generating a filtered power based on an electrical power that is generated from an renewable energy. According to an aspect, the Hodrick-Prescott filter 104 of the microgrid system 100 can be used to generate the filtered power based on the electrical power. According to an aspect, the wind turbine 102 of the microgrid system 100 can be used to generate the electrical power from a wind power.

At step 904, the method 900 includes outputting a battery power based on the electrical power and the filtered power. According to an aspect, the battery 106 of the microgrid system 100 can be used to output the battery power based on the generated electrical power and the filtered power.

At step 906, the method 900 includes controlling charging and discharging of the battery of the microgrid system by applying a feedback control on the output battery power. According to an aspect, the SoC control module 108 of the microgrid system 100 can be used to control the charging and discharging of the battery 106 of the microgrid system 100 by applying a feedback control (e.g., the feedback control 302) on the output battery power.

Figure 10:
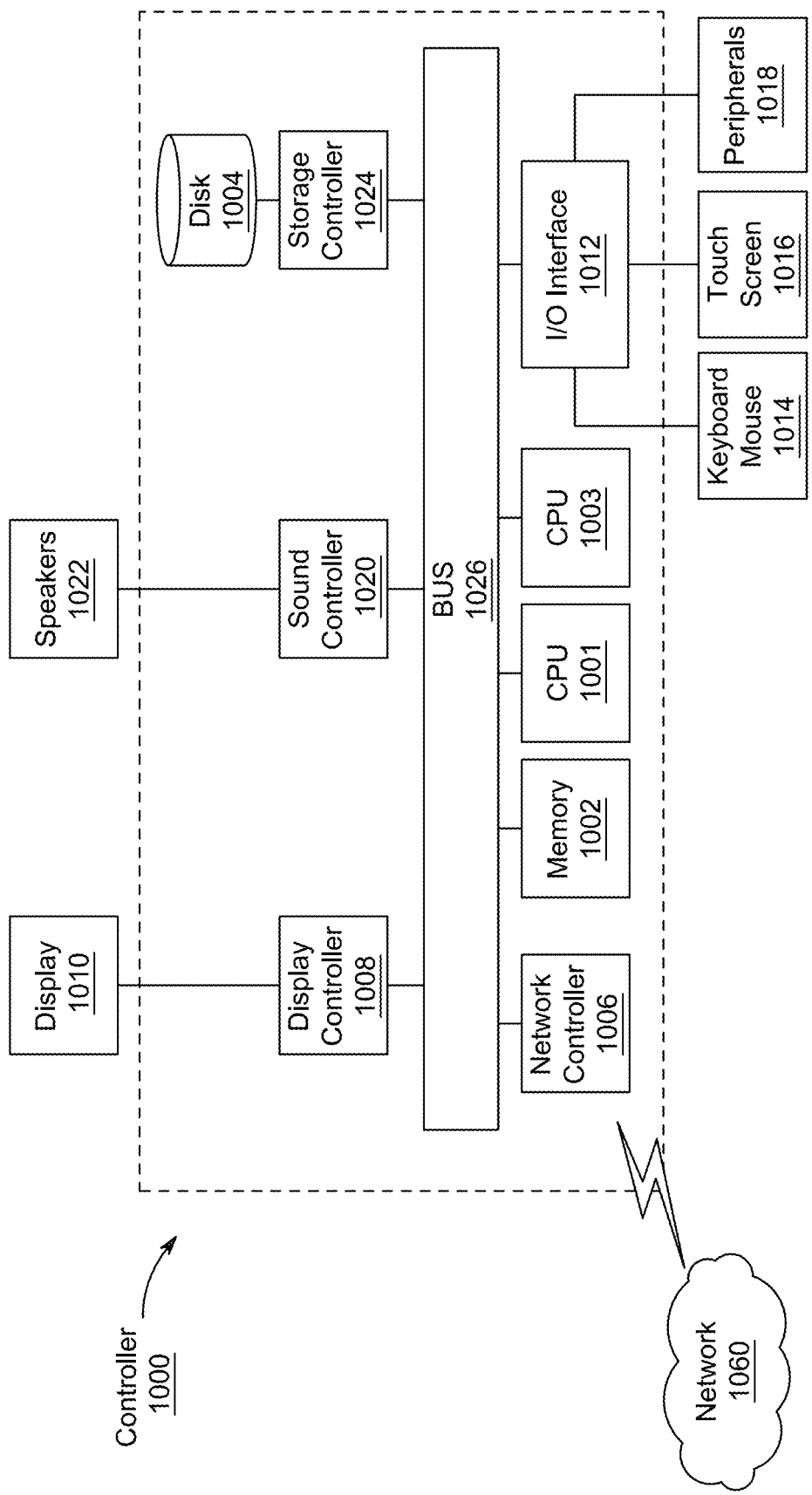
FIG. 10 is an illustration of a non-limiting example of details of computing hardware used in the computing system, according to aspects of the present disclosure.

FIG. 10 is an illustration of a non-limiting example of details of computing hardware used in the computing system, according to exemplary aspects of the present disclosure. In FIG. 10, a controller 1000 is described which is a computing device (for example, microgrid system 100) and includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001 (and/or CPU 1003) and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, the CPU 1001 (and/or CPU 1003) may be a Xenon or Core processor from Intel of America or an Opteron processor from AMD of America, or may be other processor types that would be recognized by one of ordinary skill in the art. Alternatively, the CPU 1001 (and/or CPU 1003) may be implemented on an FPGA, ASIC, PLD or using discrete logic circuits, as one of ordinary skill in the art would recognize. Further, the CPU 1001 (and/or CPU 1003) may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 11.

Figure 11:
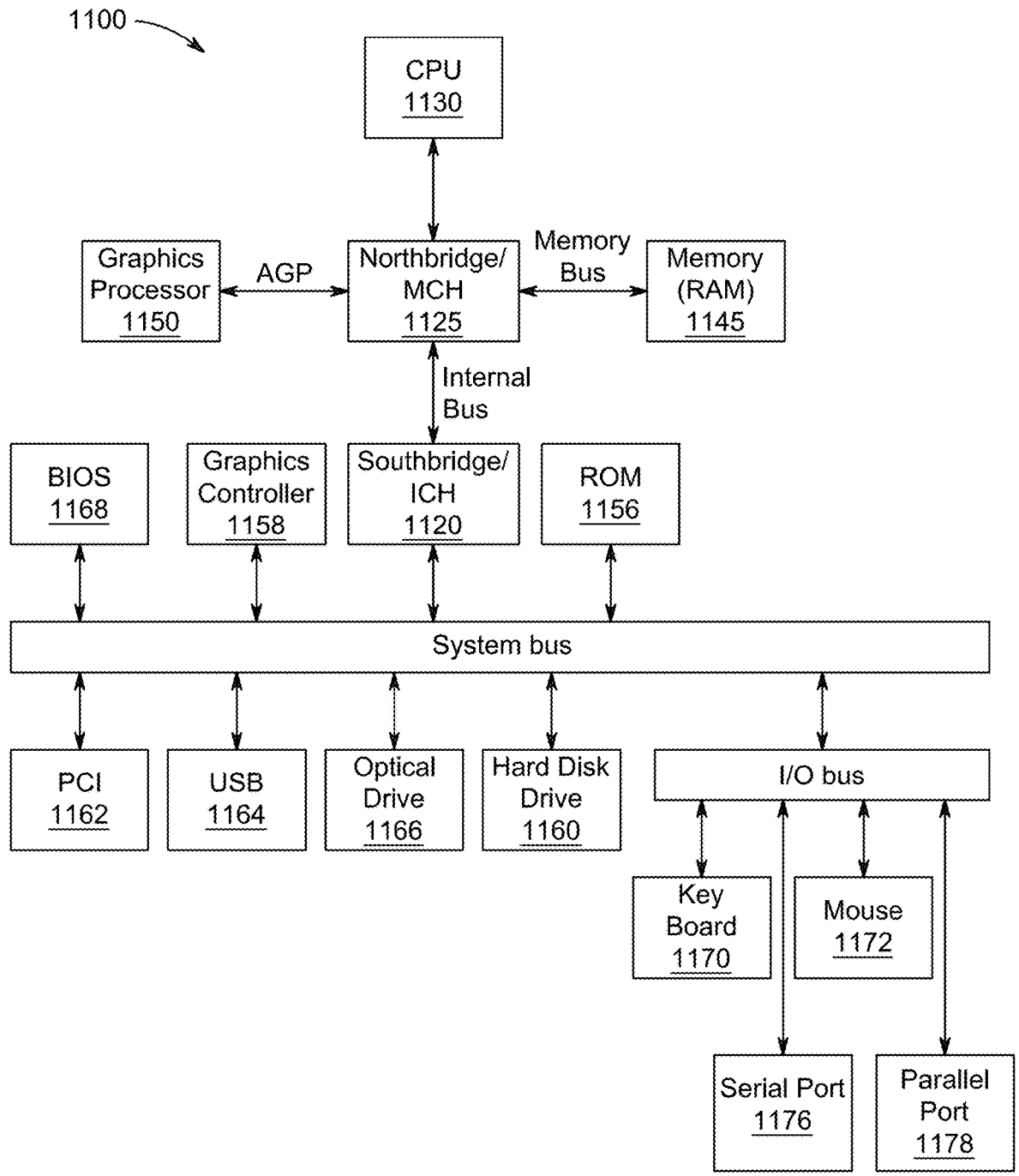
FIG. 11 is an exemplary schematic diagram of a data processing system used within the computing system, according to aspects of the present disclosure.

FIG. 11 shows a schematic diagram of a data processing system 1100 used within the computing system, according to exemplary aspects of the present disclosure. The data processing system 1100 is an example of a computer in which code or instructions implementing the processes of the illustrative aspects of the present disclosure may be located.

In FIG. 11, the data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
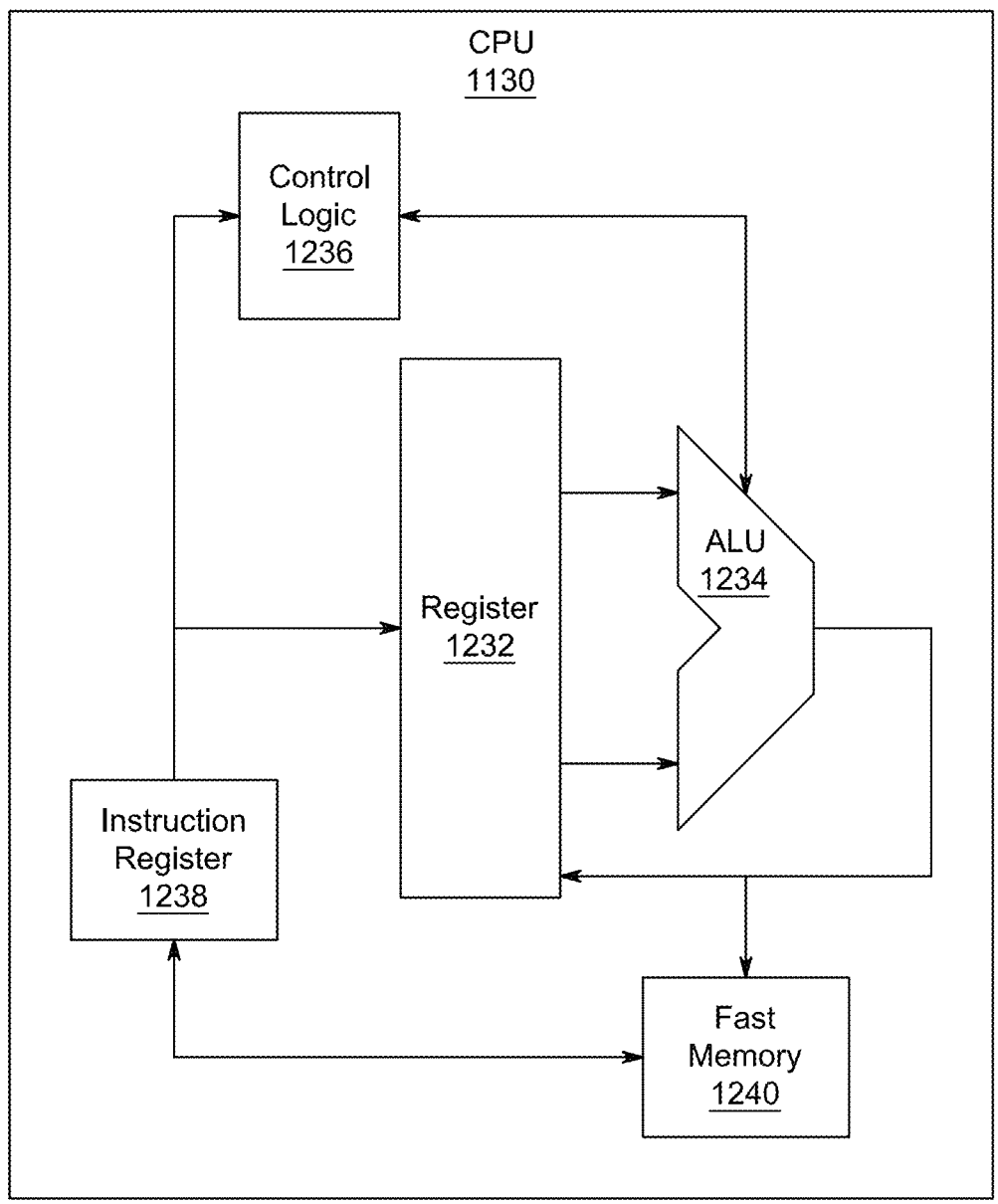
FIG. 12 is an exemplary schematic diagram of a processor used with the computing system, according to aspects of the present disclosure.

For example, FIG. 12 shows one aspects of the present disclosure of CPU 1130. In one aspects of the present disclosure, the instruction register 1238 retrieves instructions from the fast memory 1240. At least part of these instructions is fetched from the instruction register 1238 by the control logic 1236 and interpreted according to the instruction set architecture of the CPU 1130. Part of the instructions can also be directed to the register 1232. In one aspect of the present disclosure, the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232, and performs logical and mathematical operations on the loaded values according to the instructions. The results from these operations can be feedback into the register and/or stored in the fast memory 1240. According to certain aspects of the present disclosures, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 11120 through a PCI bus 1162.

The PCI devices may include, for example, Ethernet adapters, add-in cards, and PC cards for notebook computers. The Hard disk drive 1160 and CD-ROM 1156 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1160 and optical drive 1166 can also be coupled to the SB/ICH 1120 through a system bus. In one aspects of the present disclosure, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
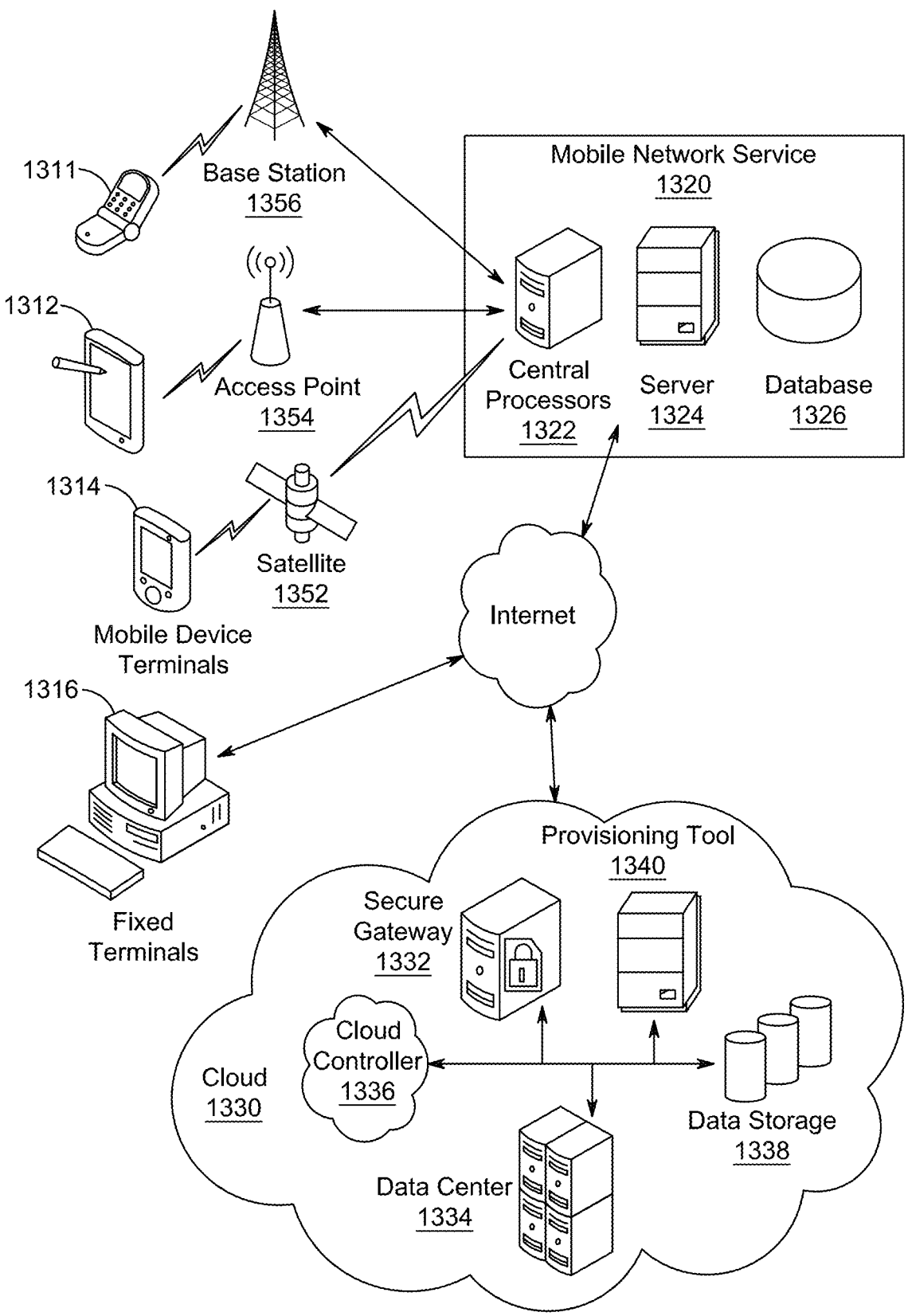
FIG. 13 is an illustration of a non-limiting example of distributed components which may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure may be practiced otherwise than as specifically described herein.

The invention claimed is:

1. A microgrid system, comprising:
a Hodrick-Prescott filter configured to generate a filtered power based on an electrical power that is generated from an renewable energy;
a battery configured to output a battery power based on the electrical power and the filtered power; and
a state of charge (SoC) control module configured to control charging and discharging of the battery by applying a feedback control on the output battery power.

2. The microgrid system of claim 1, wherein an output power of the microgrid system is generated by summing the electrical power and the output battery power.

3. The microgrid system of claim 1, wherein the output battery power is determined based on a sum of a reference power and a feedback battery power.

4. The microgrid system of claim 3, wherein the reference power is determined based on the electrical power and the filtered power.

5. The microgrid system of claim 3, wherein the feedback battery power is determined based on the feedback control being applied on the output battery power, the filtered power, and a storage capacity limit of the battery.

6. The microgrid system of claim 1, wherein the Hodrick-Prescott filter decomposes time series data $Y_t$ of the renewable energy into trend components $g_t$ and cyclical components $c_t$, and weights of the Hodrick-Prescott filter are determined by solving a constrained minimization problem over the trend components $g_t$.

7. The microgrid system of claim 6, wherein the constrained minimization problem is $$Y_t = \min_{g_t}\left\{\sum_{t=1}^{T} c_t^2 + \lambda \sum_{t=2}^{T-1}[(g_{t+1} - g_t) - (g_t - g_{t-1})]^2\right\},$$

T and $\lambda$ indicating a total time for the renewable energy and a smoothing parameter of the Hodrick-Prescott filter, respectively.

8. The microgrid system of claim 7, wherein the smoothing parameter $\lambda$ of the Hodrick-Prescott filter is about 50000.

9. A method for a microgrid system, comprising:
generating, by a Hodrick-Prescott filter of the microgrid system, a filtered power based on an electrical power that is generated from an renewable energy;
outputting, by a battery of the microgrid system, a battery power based on the electrical power and the filtered power; and
controlling, by a state of charge (SoC) control module of the microgrid system, charging and discharging of the battery of the microgrid system by applying a feedback control on the output battery power.

10. The method of claim 9, wherein an output power of the microgrid system is generated by summing the electrical power and the output battery power.

11. The method of claim 9, wherein the output battery power is determined based on a sum of a reference power and a feedback battery power.

12. The method of claim 11, wherein the reference power is determined based on the electrical power and the filtered power.

13. The method of claim 11, wherein the feedback battery power is determined based on the feedback control being applied on the output battery power, the filtered power, and a storage capacity limit of the battery.

14. The method of claim 9, wherein the Hodrick-Prescott filter decomposes time series data $Y_t$ of the renewable energy into trend components $g_t$ and cyclical components $c_t$, and weights of the Hodrick-Prescott filter are determined by solving a constrained minimization problem over the trend components $g_t$.

15. The method of claim 14, wherein the constrained minimization problem is $$Y_t = \min_{g_t}\left\{\sum_{t=1}^{T} c_t^2 + \lambda \sum_{t=2}^{T-1}[(g_{t+1} - g_t) - (g_t - g_{t-1})]^2\right\},$$

T and $\lambda$ indicating a total time for the renewable energy and a smoothing parameter of the Hodrick-Prescott filter, respectively.

16. The method of claim 15, wherein the smoothing parameter $\lambda$ of the Hodrick-Prescott filter is about 50000.

17. A non-transitory computer-readable storage medium storing a program executable by at least one processor to perform:
generating, through a Hodrick-Prescott filter of a microgrid system, a filtered power based on an electrical power that is generated from an renewable energy;
outputting, through a battery of the microgrid system, a battery power based on the electrical power and the filtered power; and
controlling, through a state of charge (SoC) control module of the microgrid system, charging and discharging of the battery of the microgrid system by applying a feedback control on the output battery power.

18. The non-transitory computer-readable storage medium of claim 17, wherein an output power of the microgrid system is generated by summing the electrical power and the output battery power.

19. The non-transitory computer-readable storage medium of claim 17, wherein the output battery power is determined based on a sum of a reference power and a feedback battery power.

20. The non-transitory computer-readable storage medium of claim 19, wherein the reference power is determined based on the electrical power and the filtered power.

* * * * *